United States Patent
Byun et al.

(10) Patent No.: US 9,559,762 B2
(45) Date of Patent: Jan. 31, 2017

(54) METHOD OF TRANSCEIVING FEEDBACK INFORMATION IN WIRELESS COMMUNICATION SYSTEM AND APPARATUS THEREFOR

(71) Applicants: LG ELECTRONICS INC., Seoul (KR); Industry-Academic Cooperation Foundation, Yonsei University, Seoul (KR)

(72) Inventors: Ilmu Byun, Seoul (KR); Kwangsoon Kim, Seoul (KR); Kyungjun Choi, Seoul (KR); Hyunsoo Ko, Seoul (KR)

(73) Assignees: LG ELECTRONICS INC., Seoul (KR); Industry-Academic Cooperation FoundaTION, Yonsei University, Seoul (KR)

( * ) Notice: Subject to any disclaimer, the term of this patent is extended or adjusted under 35 U.S.C. 154(b) by 0 days.

(21) Appl. No.: 14/747,943

(22) Filed: Jun. 23, 2015

(65) Prior Publication Data

US 2015/0381244 A1 Dec. 31, 2015

(30) Foreign Application Priority Data

Jun. 30, 2014 (KR) ........................ 10-2014-0080847
Jun. 30, 2014 (KR) ........................ 10-2014-0080848
Jun. 30, 2014 (KR) ........................ 10-2014-0080849

(51) Int. Cl.
H04B 7/04 (2006.01)
H04B 7/06 (2006.01)
H04B 7/02 (2006.01)

(52) U.S. Cl.
CPC .......... *H04B 7/0456* (2013.01); *H04B 7/0452* (2013.01); *H04B 7/065* (2013.01); *H04B 7/0626* (2013.01); *H04B 7/024* (2013.01)

(58) Field of Classification Search
USPC ................................. 375/267; 370/329, 252
See application file for complete search history.

(56) References Cited

U.S. PATENT DOCUMENTS

| 2011/0164510 A1* | 7/2011 | Zheng | H04B 7/0626 370/252 |
| 2012/0002743 A1* | 1/2012 | Cavalcante | H04B 7/024 375/267 |
| 2012/0120884 A1* | 5/2012 | Yu | H04B 7/0426 370/329 |
| 2014/0185564 A1* | 7/2014 | Dong | H04W 72/046 370/329 |

\* cited by examiner

*Primary Examiner* — Eva Puente
(74) *Attorney, Agent, or Firm* — Lee Hong Degerman Kang Waimey

(57) ABSTRACT

According to one embodiment of the present invention, a method of transmitting feedback information by a base station supporting multi-user multi-input multi-output (MU-MIMO) to a network entity includes obtaining a projection matrix based on channel information estimated for multiple channels between antennas of the base station and each of user equipments, projecting at least one of the channel information and uplink data received from the user equipments to a second space from a first space using the projection matrix and transmitting feedback information including at least one of the projected channel information and the projected uplink data to the network entity.

10 Claims, 12 Drawing Sheets

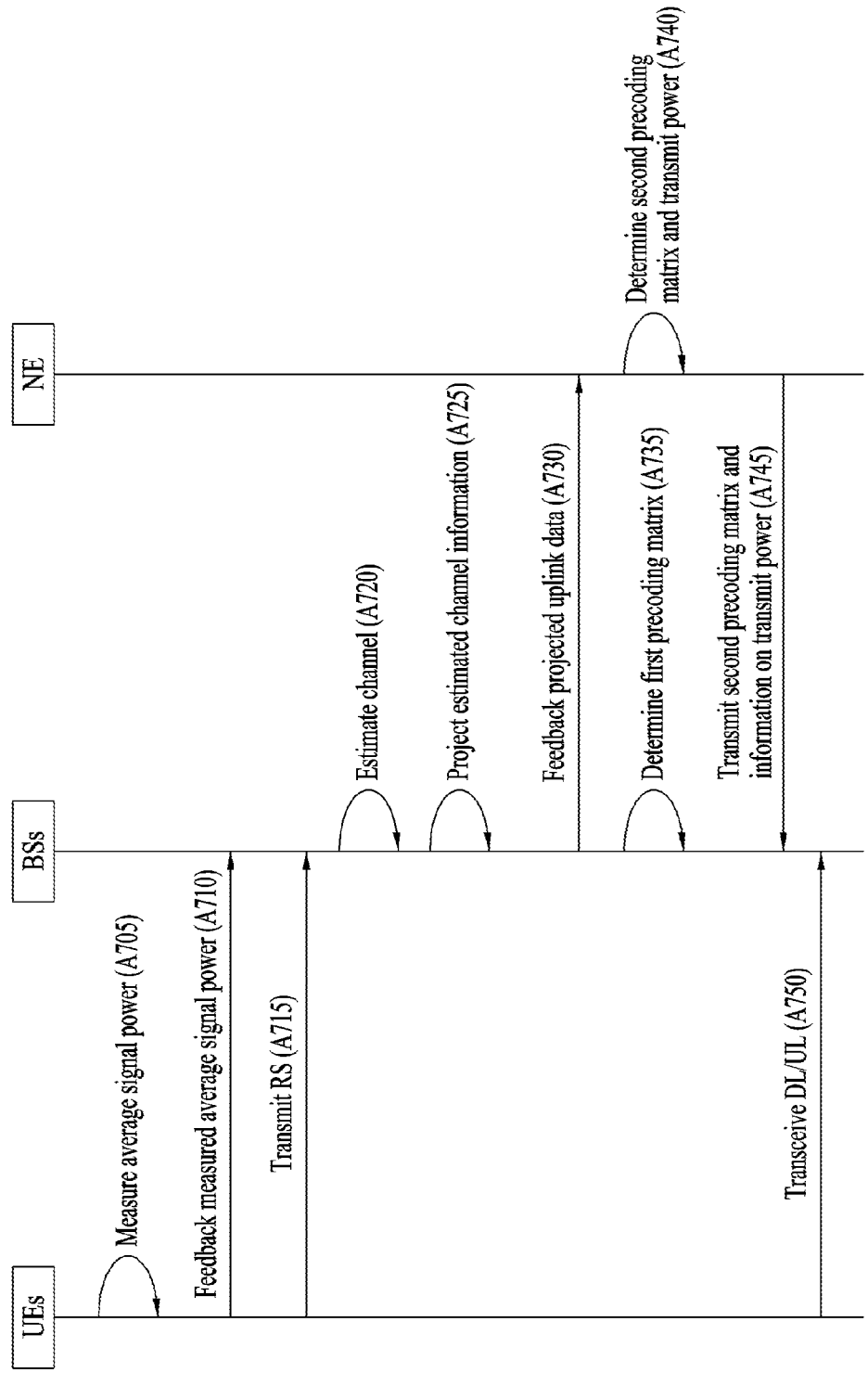

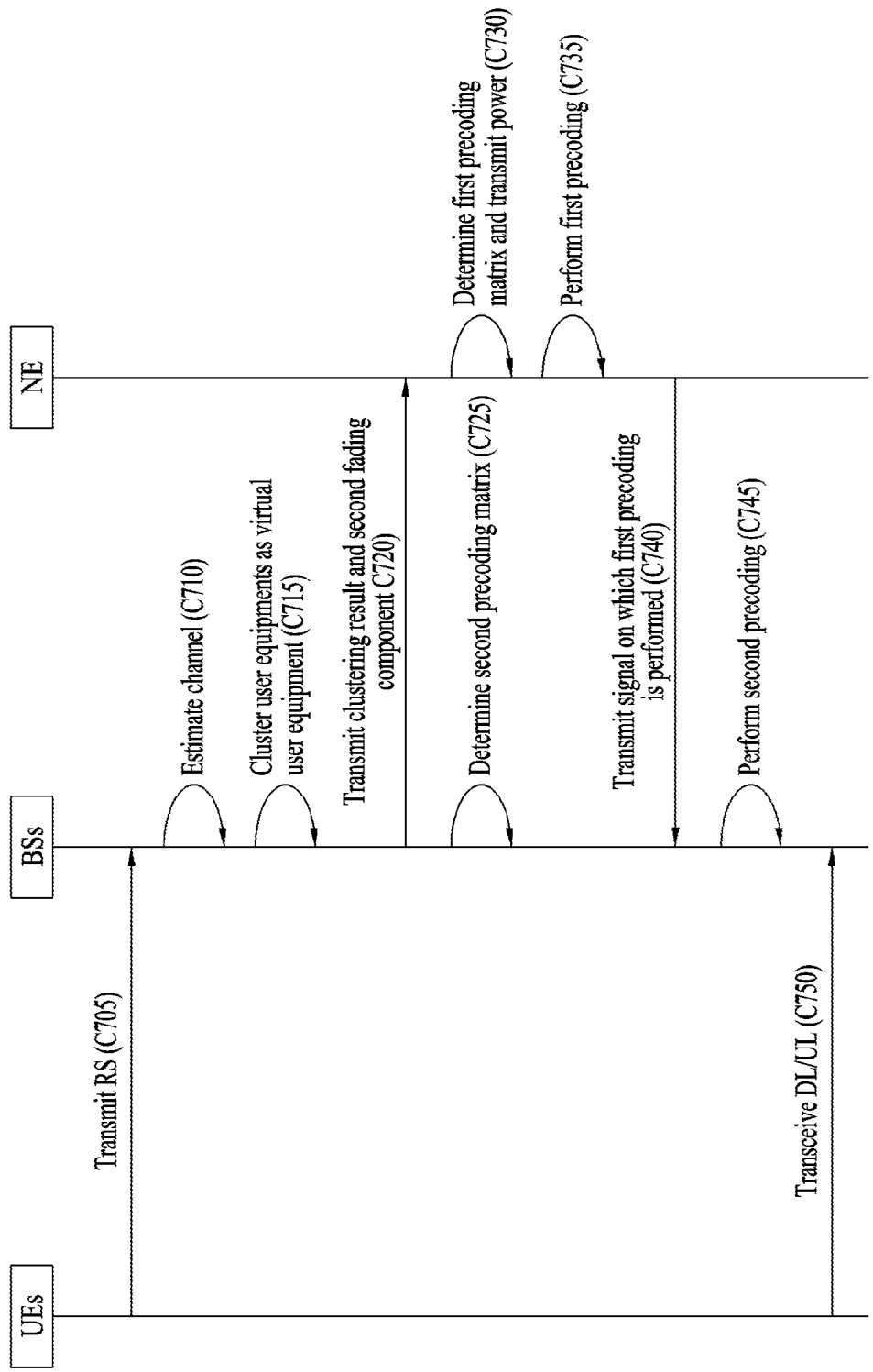

METHOD OF TRANSCEIVING FEEDBACK INFORMATION IN WIRELESS COMMUNICATION SYSTEM AND APPARATUS THEREFOR

Pursuant to 35 U.S.C. §119(a), this application claims the benefit of earlier filing date and right of priority to Korean Patent Application Nos. 10-2014-0080847, filed on Jun. 30, 2014, 10-2014-0080848, filed on Jun. 30, 2014, and 10-2014-0080849, filed on Jun. 30, 2014, the contents of which are all incorporated by reference herein in their entirety.

BACKGROUND OF THE INVENTION

Field of the Invention

The present invention relates to a method of transmitting or receiving feedback information on multiple users in a wireless communication system supporting multi-user multi-input multi-output (MU-MIMO) and an apparatus therefor.

Discussion of the Related Art

A MIMO (multi-input multi-output) technology is a technology configured to enhance efficiency of data transmission and reception using a plurality of transmitting antennas and a plurality of receiving antennas instead of using a single transmitting antenna and a single receiving antenna. If a single antenna is used, a receiving side receives data via a single antenna path. On the contrary, if multiple antennas are used, the receiving end receives data via various paths. Hence, by using the MIMO, data transmission speed and an amount of data transmission can be enhanced and coverage can also be enlarged. A single-cell MIMO operation can be classified into a single user-MIMO (SU-MIMO) scheme and a multi user-MIMO (MU-MIMO) scheme. The SU-MIMO is a scheme that a single user equipment receives a downlink signal in one cell. The MU-MIMO is a scheme that two or more user equipments receive a downlink signal in one cell.

SUMMARY OF THE INVENTION

Accordingly, the present invention is directed to an apparatus and method thereof that substantially obviate one or more problems due to limitations and disadvantages of the related art.

A technical task of the present invention is to provide a method for a base station to efficiently transmit feedback information on multiple users to a network entity in a MU-MIMO-based multi-cell cooperative communication system.

Technical tasks obtainable from the present invention are non-limited the above-mentioned technical task. And, other unmentioned technical tasks can be clearly understood from the following description by those having ordinary skill in the technical field to which the present invention pertains Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of transmitting feedback information by a base station supporting multi-user multi-input multi-output (MU-MIMO) to a network entity, includes obtaining a projection matrix based on channel information estimated for multiple channels between antennas of the base station and each of user equipments, projecting at least one of the channel information and uplink data received from the user equipments to a second space from a first space using the projection matrix and transmitting feedback information including at least one of the projected channel information and the projected uplink data to the network entity.

To further achieve these objects and other advantages and in accordance with the purpose of the invention, as embodied and broadly described herein, according to a different embodiment, a base station transmitting feedback information to a network entity includes multiple antennas configured to perform multi-user multi-input multi-output (MU-MIMO), a processor configured to obtain a projection matrix based on channel information estimated for multiple channels between antennas of the base station and each of user equipments, the processor configured to project at least one of the channel information and uplink data received from the user equipments to a second space from a first space using the projection matrix and a backhaul interface configured to transmit feedback information including at least one of the projected channel information and the projected uplink data to the network entity.

To further achieve these objects and other advantages and in accordance with the purpose of the invention, as embodied and broadly described herein, according to a further different embodiment, a method of receiving feedback information by a network entity from base stations supporting multi-user multi-input multi-output (MU-MIMO), includes receiving first feedback information including at least one of first channel information between antennas of a first base station and user equipments and a first uplink data from the first base station among the base stations and receiving second feedback information including at least one of second channel information between antennas of a second base station and the user equipments and a second uplink data from the second base station among the base stations. In this case, at least one of the first channel information, the first uplink data, the second channel information and the second channel information can be projected to a second space from a first space by a projected channel matrix.

To further achieve these objects and other advantages and in accordance with the purpose of the invention, as embodied and broadly described herein, according to a further different embodiment, a network entity receiving feedback information from base stations includes a processor and a backhaul interface configured to receive first feedback information including at least one of first channel information between antennas of a first base station and user equipments and a first uplink data from the first base station among the base stations, the backhaul interface configured to receive second feedback information including at least one of second channel information between antennas of a second base station and the user equipments and a second uplink data from the second base station among the base stations. In this case, at least one of the first channel information, the first uplink data, the second channel information and the second channel information can be projected to a second space from a first space by a projected channel matrix.

According to one embodiment of the present invention, it is able to reduce a size of feedback information transmitted to a network entity and backhaul overhead in a manner that a base station projects channel information estimated for multiple users or uplink data.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 2A is a flowchart for a method of transmitting or receiving channel information according to one embodiment of the present invention;

FIG. 2C is a flowchart for a method of performing hierarchical precoding according to one embodiment of the present invention;

DETAILED DESCRIPTION OF THE INVENTION

Figure 1:
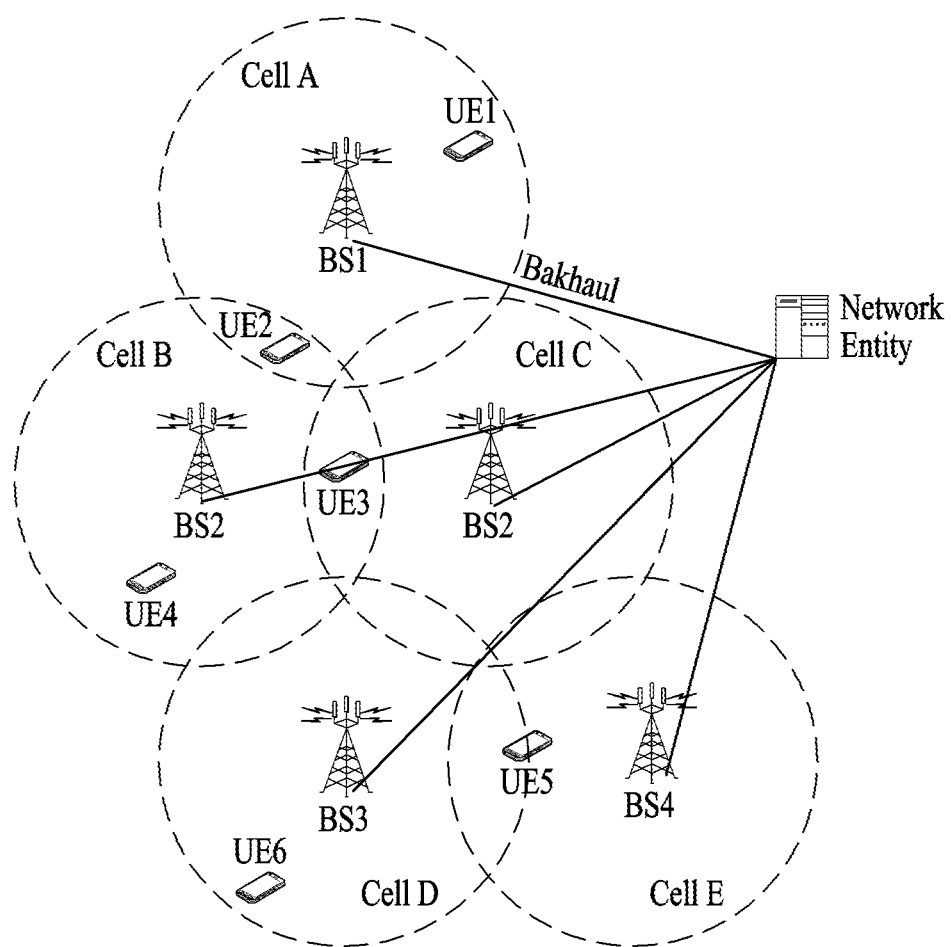
FIG. 1 is a diagram for a cooperative communication (CoMP) system of multiple cells based on massive MIMO according to one embodiment of the present invention.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In this specification, embodiments of the present invention are described centering on the data transmission/reception relations between a base station and a user equipment. In this case, the base station has a meaning of a terminal node of a network directly communicating with a user equipment. In this disclosure, a specific operation explained as performed by a base station may be performed by an upper node of the base station in some cases.

In particular, in a network constructed with a plurality of network nodes including a base station, it is apparent that various operations performed for communication with a mobile station can be performed by a base station or other network nodes except the base station. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Massive MIMO

Massive MIMO corresponds to a form that more antennas are integrated to a legacy antenna array. According to the massive MIMO, hundreds of antennas installed in a base station are arranged in a space to obtain a directivity radiation pattern and pencil beamforming. If many small antennas are used in a single array, it is able to obtain performance identical to performance of a single large antenna.

In order for a base station to provide high frequency efficiency in a cellular system using the massive MIMO, it is mandatory to properly control inter-cell interference. According to one embodiment of the present invention, a CoMP scheme is used to process the inter-cell interference. According to the CoMP scheme applied to the massive MIMO system, pluralities of adjacent base stations transmit channel information to a network entity. In this case, the network entity may correspond to a random network node in a cellular network. For instance, the network entity may correspond to one of base stations operating according to the CoMP scheme or a node controlling base stations in a core network, by which the present invention may be non-limited.

Meanwhile, each base station should feedback channel information of each user to the network entity. Since an amount of the channel information to be fed back is proportional to the number of antennas and the number of users, a size of channel information, which is fed back via a backhaul, is huge in a system using the massive MIMO.

Proposal 1. Proposal on Channel Information Feedback

Massive MIMO transmits and receives channel information using a favorable propagation described in the following.

$$\frac{1}{M} G_l G_l^H \stackrel{M \gg K}{=} D_l = \text{diag}(\beta_{l1}, \beta_{l2}, \ldots, \beta_{lK})$$ [Formula 1]

In this case, M and K correspond to the number of antennas and the number of terminals (users), respectively. For clarity, assume that the number of antennas of each terminal corresponds to 1, by which the present invention may be non-limited.

$G_l$ corresponds to 'K×M' matrix and indicates channels between each antenna and each terminal of an $l^{th}$ base station. If the number of antennas of a terminal corresponds to N, those skilled in the art are able to understand that the $G_l$ becomes 'K×MN' matrix. $D_l$ corresponds to 'K×K' diagonal matrix and a (k, k)$^{th}$ element corresponds to $\beta_{lk}$. The $\beta_{lk}$ indicates a long-term fading component or average channel power between the $l^{th}$ base station and a $k^{th}$ terminal. For reference, the $G_l$ includes both a short-term fading component and the long-term fading component between antennas of the base station and terminals.

Since the long-term fading component is determined by path fading due to a distance between a base station and a terminal, shadowing and an antenna characteristic, the long-term fading component is changing over relatively long time. On the contrary, since the shot-term fading component is affected by an offset of a signal or constructive interference, the shot-term fading component is changing over relatively short time. In other word, coherence time of the long-term fading component is longer than coherence time of the short-term fading component.

In Formula 1, if the channel matrix $G_l$ is projected to a prescribed vector space, a diagonal matrix $D_l$ consisting of a long-term fading component between K number of base stations and terminals or an average channel power component is obtained. Hence, if the diagonal matrix $D_l$ consisting of K number of real number elements is fed back rather than the channel matrix $G_l$ consisting of KM number of complex number elements, it may be able to reduce backhaul overhead resulted from the feedback. In particular, since a size of the diagonal matrix $D_l$ is independent from the number of antennas M of the base station, it is appropriate for cooperative transmission and reception using the massive MIMO.

Proposal 2. Transmission and Reception of Uplink Data

A cooperative (CoMP) detection scheme detecting a signal of a user in a manner of cooperating with each other between multiple cells can be used. For instance, if a signal, which is cooperatively received by base stations, is transmitted to a network entity via a backhaul link, the network entity detects the signal in a manner of combining signals received by one or more cooperative base stations with each other.

A signal $r_l$ received by a base station 1 can be represented as follows.

$$r_l = \sum_{j=1}^{K} g_{lj} s_j + n_l = G_l s + n_l$$ [Formula 2]

In Formula 2, $g_{ij}$ corresponds to a channel vector of M dimension between a terminal j and a base station 1, $s_j$ corresponds to a transmission signal of the terminal j, $n_l$ corresponds to a noise component of the base station 1 and $G_l=[g_{l1}, g_{l2}, \ldots, g_{lK}]$ corresponds to 'K×M' matrix and indicates channels between each antenna and each terminal. $s=[s_1, s_2, \ldots, s_K]$ corresponds to a transmission signal vector of terminals. A dimension of a received signal increases in proportion to the number of antennas M of a base station. The received signal is projected as shown in Formula 3. In this case, the projection has a meaning including conversion, transposition, compression, coding or mapping from a value of a first space (or first domain) into a value of a second space (second domain). Such a terminology as the projection can be replaced with a different terminology including equivalent meaning.

$$\tilde{r}_l = \frac{1}{M} G_l^H G_l r_l = D_l s + \frac{1}{M} G_l^H n_l$$ [Formula 3]

In Formula 3, it may be able to represent as $$D_l = \frac{1}{M} G_l^H G_l.$$

In this case, a dimension of a projected signal $\tilde{r}_l$ corresponds to K. Hence, if the number of antennas of a base station is greater than the number of terminals, which should cooperatively detect the signal, transmission of the projected signal $\tilde{r}_l$ transmitted to a network entity may be efficient. Moreover, if the number of antennas of the base station increases, it may be able to obtain a relation such as the aforementioned Formula 1.

Proposal 3. Transmission and Reception of Downlink Data

'M×K' precoding matrix used by a base station 1 to perform precoding on a downlink signal can be represented as $F_l$. In order to eliminate inter-UE interference, Formula 4 in the following should be satisfied.

$$\sum_{l=1}^{L} G_l F_l = I_K$$ [Formula 4]

Formula 4 is based on a zero-forcing-based precoding scheme, by which the present invention may be non-limited. A precoding matrix based on the zero-forcing can be obtained using Formula 5 in the following.

$$F = G^H (GG^H)^{-1}$$ [Formula 5]

In Formula 5, F and G can be represented as $F=[F_1^T, F_2^T, \ldots, F_L^T]^T$ and $G=[G_1, G_2, \ldots, G_L]$, respectively. As shown in Formula 5, in order to obtain a precoding matrix used in a base station 1, it is necessary to have not only a channel matrix $G_l$ of the base station 1 but also channel matrixes $G_1, \ldots, G_{l-1}, G_{l+1}, \ldots, G_L$ of different base stations. In particular, if each base station estimates a channel matrix and transmits the estimated channel matrix to a network entity, the network entity can determine the precoding matrix.

According to one embodiment of the present invention, a base station divides channel information into two fading components and feeds back one the two fading components only. And, according to the present invention, a precoding procedure for terminals is divided into at least two or more steps and precoding on signals of the terminals is hierarchically performed. For instance, a first precoding configured to eliminate interference using a second fading component and a second precoding configured to eliminate interference using a first fading component can be hierarchically performed. The first fading component may correspond to a short-term fading component and the second fading component may correspond to a long-term fading component. The first precoding and the second precoding can be called as a macro precoding and a micro precoding, respectively.

For instance, the second precoding using the short-term fading component uses a channel matrix $G_l$ estimated by each base station and the second precoding is independent from channel matrixes estimated by different base stations. Yet, the first precoding uses long-term fading components of all base stations. Meanwhile, since the long-term fading component does not change for relatively longer time compared to the short-term fading component, in particular, since coherence time of the long-term fading component is longer than coherence time of the short-term fading component, the long-term fading component can be intermittently fed back. Hence, in case of feeding back the long-term fading component, a size of feedback information and a frequency of feedback are reduced compared to a case of feeding back whole channel information including the short-term fading component.

Massive MIMO-Based Cooperative Communication System

FIG. 1 is a diagram for a cooperative communication (CoMP) system of multiple cells based on massive MIMO. The system shown in FIG. 1 includes a plurality of base stations (BS 1 to BS 4), a plurality of user equipments (UE 1 to UE 5), and a network entity.

There is no limit on the number of base stations participating in cooperative communication. In the present embodiment, assume that L (L is a natural number equal to or greater than 1) number of base stations are participating in the cooperative communication. A downlink channel between an $l^{th}$ base station and a $k^{th}$ user equipment can be represented by a vector $g_{lk}$ of M dimension in the following.

$$g_{lk} = \sqrt{\beta_{lk}} h_{lk} \quad \text{[Formula 6]}$$

In this case, $\beta_{lk}$ corresponds to average reception power or a long-term fading component between the $l^{th}$ base station and the $k^{th}$ user equipment or and $h_{lk}$ corresponds to a short-term fading component between the $l^{th}$ base station and the $k^{th}$ user equipment.

Reference Signal (RS)

If a sequence of an RS corresponding to a user equipment k is $\phi_{\pi_k}$, a signal transmitted by the user equipment k can be represented as follows.

$$s_k^{UL} = \sqrt{T^{UL} P_k^{UL}} \phi_{\pi_k} \quad \text{[Formula 7]}$$

In this case, $P_k^{UL}$ corresponds to uplink transmit power, $T^{UL}$ corresponds to a length (e.g., the number of OFDM symbols in 3GPP LTE) of a time resource allocated to transmit an RS, and $\pi_k$ corresponds to an index of an RS corresponding to the user equipment k. RSs of which the index $\pi_k$ is different from each other may have a characteristic orthogonal to each other. Hence, if i is identical to j, $\phi_i^H \phi_j = 1$ is satisfied. On the contrary, if the i is not identical to the j, $\phi_i^H \phi_j = 0$ is satisfied.

For instance, if an RS transmitted by the user equipment k is received by the base station 1, the RS received by the base station 1 can be represented as Formula 8 in the following.

$$Y_l = \sum_{j=1}^{K} \sqrt{T^{UL} P_l^{UL} \beta_{lj}} h_{lj} \phi_{\pi_j}^H + V_l \quad \text{[Formula 8]}$$

$V_l$ corresponds to a matrix of M×T size and indicates noise of uplink.

Estimation of Channel Information

Having received the RS signal, the base station can estimate channel information based on the received RS. For instance, as an embodiment, channel information obtained using a least square (LS) channel estimating scheme can be represented as Formula 9 in the following.

$$\hat{g}_{lk} = \frac{1}{\sqrt{T^{UL} P_k^{UL}}} Y_l \phi_{\pi_k} \quad \text{[Formula 9]}$$

$$= g_{lk} + \sum_{j \in J_{\pi_k} \setminus \{k\}} \sqrt{\frac{P_j^{UL}}{P_k^{UL}}} g_{lj} + \tilde{v}_{lk}$$

$\hat{g}_{lk}$ corresponds to a vector of M dimension including M number of channel estimation values. The vector corresponds to a channel estimation vector for an actual downlink channel $g_{lk}$ between the $l^{th}$ base station and the $k^{th}$ user equipment. $J_j$ corresponds to a set of user equipments, which has transmitted an RS of which an index corresponds to j and $\tilde{v}_{lk} = (T^{UL} P_k^{UL})^{-1/2} V_l \phi_{\pi_k}$ corresponds to a noise component.

A short-term fading component of channel information can be represented as Formula 10 in the following.

$$\hat{h}_{lk} = q_{lk} Y_l \phi_{\pi_k} \quad \text{[Formula 10]}$$

$$= \varphi_{lkk} h_{lk} + \sum_{j \in J_{\pi_k} \setminus \{k\}} \varphi_{ljk} h_{lj} + q_{lk} \tilde{v}_{lk}$$

In Formula 10, it may be able to represented as $$q_{lk} = \left( T^{UL} \Sigma_{i \in J_{\pi_k}} P_i^{UL} \beta_{li} + N_0 \right)^{-1/2} \text{ and}$$

$$\varphi_{ljk} = \left( \frac{P_j^{UL} \beta_{lj}}{\Sigma_{i \in J_{\pi_k}} P_i^{UL} \beta_{lj} + N_0 / T^{UL}} \right).$$

Projection Matrix

A projection matrix can be obtained from estimated channel information (or channel matrix). The projection matrix can be obtained in various ways. For instance, Formula 11 to Formula 13 shows projection matrixes according to embodiments of the present invention.

In case of using a normalized matched filter, a projection matrix (or projection filter) of a base station 1 can be represented as Formula 11 in the following.

$$P_l = \frac{1}{M} \hat{G}_l^H \quad \text{[Formula 11]}$$

In Formula 11, $\hat{G}_l^H$ corresponds to a Hermitian matrix of estimated channel information $\hat{G}_l=[\hat{g}_{l1}, \hat{g}_{l2}, \ldots, \hat{g}_{lK}]$.

$$P_l = \frac{1}{M}\hat{H}_l^H \quad \text{[Formula 12]}$$

In Formula 12, $\hat{H}_l^H$ corresponds to a Hermitian matrix of a short-term fading component $\hat{H}_l=[\hat{h}_{l1}, \hat{h}_{l2}, \ldots, \hat{h}_{lK}]$ of estimated channel information.

$$P_l = \frac{1}{M}\text{diag}(\beta_{l1}^{-1/2}, \beta_{l2}^{-1/2}, \ldots, \beta_{lK}^{-1/2})\hat{H}_l^H \quad \text{[Formula 13]}$$

$$P_l = K_l \hat{H}_l^H \quad \text{[Formula 14]}$$

In Formula 14, $K_l$ may correspond to a random matrix. For instance, an embodiment of Formula 11 can be represented as $$K_l = \frac{1}{M}\text{diag}(\sqrt{\beta_{l1}}, \sqrt{\beta_{l2}}, \ldots, \sqrt{\beta_{lK}}).$$

An embodiment of Formula 12 can be represented as $$K_l = \frac{1}{M}I_K.$$

In this case, $I_K$ corresponds to a unit matrix of a size of 'K×K'. An embodiment of Formula 13 can be represented as $K_l=\text{diag}(\beta_{l1}^{-1/2}, \beta_{l2}^{-1/2}, \ldots, \beta_{lK}^{-1/2})$.

In case of using a zero-forcing filter, a projection matrix of the base station 1 can be represented as Formula 15 in the following.

$$P_l = (\hat{G}_l^H \hat{G}_l^H)\hat{G}_l^H \quad \text{[Formula 15]}$$

Projection of Channel Information

Since estimated channel information exists in a complex vector space, channel estimation values of not projected channel information have complex values. The estimated channel information can be projected into a vector space of a real number. If a projection matrix used in a base station 1 corresponds to $P_l$, projected channel information $E_l$ can be defined as Formula 16 in the following.

$$E_l = P_l G_l \quad \text{[Formula 16]}$$

A set of available projection schemes can be represented as Formula 17 in the following.

$$P_l = \{P_l^1, P_l^2, \ldots, P_l^N\} \quad \text{[Formula 17]}$$

In an embodiment using a normalized matched filter, one channel estimation vector can be projected according to Formula 11 and Formula 16 among channel information of a user equipment k and channel information of a base station 1. A result of the projection can be represented as Formula 18 in the following.

$$e_{lki} = \frac{1}{M}\hat{g}_{lk}^H g_{li} \quad \text{[Formula 17]}$$

$$= \frac{g_{lk}^H g_{li}}{M} + \sum_{j \in \mathcal{J}_{\pi_k}\backslash\{k\}} \sqrt{\frac{P_j^{UL}}{P_k^{UL}}}\frac{g_{lj}^H g_{li}}{M} + \frac{\tilde{v}_{lk}^H g_{li}}{M}$$

$e_{lki}$ corresponds to a projected channel estimation vector. In this case, k and i correspond to indexes of a user equipment and 1 corresponds to an index of a base station. The number of projected channel estimation values is dependent on the number of user equipment K and is independent from the number of base station M. Meanwhile, if the M is sufficiently big in the massive MIMO, the $e_{lki}$ of Formula 17 can be considered as Formula 18 in the following.

$$\begin{cases} \sqrt{\frac{P_i^{UL}}{P_k^{UL}}}\beta_{li}, & i \in \mathcal{J}_{\pi_k}, \\ 0, & i \notin \mathcal{J}_{\pi_k}, \end{cases} \text{ as } M \to \infty \quad \text{[Formula 18]}$$

According to Formula 18, a projected channel estimation vector is represented by uplink transmit power of a user equipment i, uplink transmit power of a user equipment k and a long-term fading component. For instance, this can be comprehended as a short-term fading component is eliminated from the projected channel estimation vector. And, according to Formula 18, a projected channel estimation vector consists of K number of real number values and includes $|\mathcal{J}_{\pi_k}|$ number of real number values, which are not 0, and $K-|\mathcal{J}_{\pi_k}|$ number of 0s (zeros). For reference, a not projected channel estimation vector includes M number of complex channel estimation values.

In a different embodiment using a zero-forcing filter, if M is sufficiently big in the massive MIMO, one channel estimation vector can be projected according to Formula 15 and Formula 16 among channel information (or channel matrix) of a user equipment k and channel information of a base station 1. A result of the projection can be represented as Formula 19 in the following.

$$e_{lki} = \begin{cases} 1 & i \in J_{\pi_k} \\ 0 & i \notin J_{\pi_k} \end{cases} \quad \text{[Formula 19]}$$

According Formula 19, there exists the total K number of projected channel estimation vector values. The $|\mathcal{J}_{\pi_k}|$ number of projected channel estimation vector values corresponds to 1 and the $K-|\mathcal{J}_{\pi_k}|$ number of projected channel estimation vector values corresponds to 0.

As mentioned in the foregoing description, since the projected channel estimation vector includes the total K number of real number values, data size is reduced compared to complex values of the M (M>K) number of not projected channel estimation vectors. In particular, if an RS index different from each other according to a user equipment is assigned, since RSs are orthogonal to each other, projected channel information (or channel matrix) can be configured by a diagonal matrix. Hence, the projected channel information can be represented by the K number of elements only, which are not 0. Hence, a base station may be able to feedback the K number of real number elements to a network instead of feeding back the KM number of complex elements to the network.

Projection of Uplink Data

For instance, a projected uplink data can be represented as Formula 20 in the following.

$$\tilde{r}_l = P_l r_l \quad \text{[Formula 20]}$$
$$= P_l G_l s + P_l n_l$$
$$= \tilde{G}_l s + \tilde{n}_l$$

In this case, $\tilde{G}_l = P_l G_l$ corresponds to a projected channel matrix and $\tilde{n}_l = P_l n_l$ corresponds to a projected noise component. As defined in Formula 2, $r_l$ corresponds to uplink data received by a base station 1.

In case of using $$P_l = \frac{1}{M}\hat{G}_l$$

as a projection matrix, an element (m, n) of a projected channel matrix can be represented as Formula 21 in the following.

[Formula 21]

$$[P_l G_l]_{m,n} = \begin{cases} \beta_{ln} & \text{if } \pi_m = \pi_n \\ 0 & \text{if } \pi_m \neq \pi_n \end{cases}$$

In this case, $\pi_n$ corresponds to an index of an RS transmitted by a user equipment n.

In case of using $$P_l = \frac{1}{M}\hat{H}_l^H$$

as a projection matrix according to a different embodiment, an element (m, n) of a projected channel matrix can be represented as Formula 22 in the following.

$$[P_l G_l]_{m,n} = \begin{cases} \sqrt{\beta_{ln}} & \text{if } \pi_m = \pi_n \\ 0 & \text{if } \pi_m \neq \pi_n \end{cases} \quad \text{[Formula 22]}$$

In case of using $$P_l = \frac{1}{M}\text{diag}(\beta_{l1}^{-1/2}, \beta_{l2}^{-1/2}, \ldots, \beta_{lK}^{-1/2})\hat{H}_l^H$$

as a projection matrix according to a further different embodiment, an element (m, n) of a projected channel matrix can be represented as Formula 23 in the following.

$$[P_l G_l]_{m,n} = \begin{cases} 1 & \text{if } \pi_m = \pi_n \\ 0 & \text{if } \pi_m \neq \pi_n \end{cases} \quad \text{[Formula 23]}$$

According to Formula 16, elements of a projected channel matrix are dependent on an RS index only and are determined independent of a long-term fading component.

The projected channel matrixes defined in Formula 21 to Formula 23 include the total $$\sum_{i=1}^{T_P} |J_i|$$

number of elements, which are not 0, and include the $$K^2 - \sum_{i=1}^{T_P} |J_i|$$

number of 0s. And, a projected channel matrix can include the K square number of real number elements.

Hence, the projected channel matrix is greater than a not projected channel matrix $\hat{G}_l$ including the MK number of complex numbers in data size.

According to Formula 21 and Formula 32, a projected channel matrix is represented by a long-term fading component of a user equipment m and a long-term fading component of a user equipment n. For instance, it can be comprehended as a short-term fading component is eliminated from the projected channel matrix. And, according to Formula 23, it can be comprehended as both the long-term fading component and the short-term fading component are eliminated from the projected channel matrix.

And, if an RS index different from each other is assigned according to a user equipment, since RSs are orthogonal to each other, projected channel information (or a channel matrix) can be configured by a diagonal matrix. Hence, the projected channel information can be represented by the K number of elements, which are not 0. Hence, a base station may be able to feedback the K number of real number elements to a network instead of feeding back the KM number of complex elements to the network.

Operation and Structure of Base Station (BS), Network Entity (NE) or User Equipment (UE)

In explaining operations and structures of a base station, a network entity and a user equipment, explanation on contents overlapped with what is mentioned earlier is omitted at this time.

A. Embodiment According to Proposal 1

FIG. 2A is a flowchart for a method of transmitting or receiving channel information according to one embodiment of the present invention.

User equipments measure average power of a signal received in downlink [A705] and feedback the measured average power to base stations [A710]. Each of the base stations can estimate a downlink channel based on the average power received from the user equipments. Meanwhile, the user equipments can transmit uplink RSs to the base stations to estimate an uplink channel of a base station [A715].

The base stations estimate an uplink channel based on an uplink RS [A720].

The base stations projects at least a part of estimated channel information [A725].

(7A-i) Transmission of Projected Channel Information

The base stations transmit feedback information including channel information of which at least a part of the channel information is projected to a network entity [A730]. The feedback information can include a part of remaining channel information which is not projected, information on a projection scheme and identification information (or an index) of a user equipment. For instance, in case of projecting whole channel information, projected channel information transmitted to the network entity by a base station 1 can be represented as Formula 24 in the following.

$$F_I = \{e_{lkj} | k \in K, j \in K\} \quad \text{[Formula 24]}$$

In this case, it may be able to represent as K={1, 2, ..., K}. The projected channel information corresponds to the total $K^2$ number of real number values. Among the $K^2$ number of real number values, the $$\sum_{k=1}^{K} |J_{\pi_k}|$$

number of real number values correspond to values, which are not 0 and the $$K^2 - \sum_{k=1}^{K} |J_{\pi_k}|$$

number of real number values correspond to 0.

For reference, in case of transmitting the channel information estimated by the base station 1 to the network entity instead of projecting the channel information, the cannel information can be represented as Formula 25 in the following.

$$F_I = \{\hat{g}_{lk} | k=1, \ldots, K\} \quad \text{[Formula 25]}$$

In this case, the channel information corresponds to the total MK number of complex number values. Hence, the projected channel information may be less than the estimated channel information.

The base station 1 can transmit both the projected channel information and the not projected channel information to the network entity. In this case, the transmitted channel information can be represented as Formula 26 in the following.

$$F_I = F_I^{(1)} \cup F_I^{(2)}$$

$$F_I^{(1)} \{e_{lkj} | j \in K, k \in K^{(1)}\}$$

$$F_I^{(2)} = \{\hat{g}_{lk} | k \in K^{(2)}\} \quad \text{[Formula 26]}$$

In this case, $K^{(1)}$ and $K^{(2)}$ may correspond to a subset of K.

(7A-ii) Determination of Local Precoding Matrix

Referring back to FIG. 2A, the base stations determine a local precoding matrix [A735]. For instance, the base stations can determine the local precoding matrix based on estimated channel information to perform beamforming on each of user equipments. Yet, since the local precoding matrix is locally determined by each base station, the local precoding matrix is determined in a state that a channel state of a different base station and a channel state of a user equipment are not considered.

It may be able to use a projection matrix, which has been used for projecting channel information, as the local precoding matrix determined by the base station. For instance, in case of using a matched filter, a local precoding matrix $F_1$ determined by a base station 1 can be represented as Formula 27 in the following.

$$F_l = \frac{1}{M} \hat{G}_l^H \quad \text{[Formula 27]}$$

In case of using a zero-forcing filter, the local precoding matrix $F_1$ determined by the base station 1 can be represented as Formula 28 in the following.

$$F_l = \hat{G}_l (\hat{G}_l^H \hat{G}_l)^{-1}$$

(7A-iii) Determination of a Global Precoding Matrix

A network entity determines a global precoding matrix and transmit power based on feedback information received from base stations [A740]. For instance, the network entity can determine a global precoding matrix $U_l$ as flows. As shown in Formula 24, if the network entity receives wholly projected channel information from each of base stations, downlink transmission and reception can be represented as Formula 29 in the following.

$$r = EUs + n \quad \text{[Formula 29]}$$

In Formula 29, $E=[E_1, E_2, \ldots, E_L]$ corresponds to a projection channel, $r=[r_1 r_2 \ldots, r_K]^T$ corresponds to a reception signal of a user equipment and $U=[U_1^T, U_2^T, \ldots, U_L^T]^T$ corresponds to a global precoding matrix determined by a network entity. As one embodiment, a global precoding matrix based on a matched filter can be represented as Formula 30 in the following. As a different embodiment, a global precoding matrix based on a zero-forcing filter can be represented as Formula 31 in the following.

$$U = E^H \quad \text{[Formula 30]}$$

$$U = E^H (EE^H)^{-1} \quad \text{[Formula 31]}$$

Meanwhile, if channel information received by the network entity from a base station corresponds to channel information such as not projected channel information shown in Formula 25, downlink transmission and reception can be represented as Formula 32 in the following. In this case, a global precoding matrix based on the matched filter and a global precoding matrix based on the zero-forcing filter can be determined as Formula 33 and Formula 34, respectively.

$$r = \hat{G}Us + n \quad \text{[Formula 32]}$$

$$U = \hat{G}^H \quad \text{[Formula 33]}$$

$$U = \hat{G}^H (\hat{G}\hat{G}^H) \quad \text{[Formula 34]}$$

Meanwhile, if the channel information received by the network entity from the base station corresponds to channel information of which a part of the channel information is projected only and the rest of the channel information is not projected, transmission and reception relation for all channels can be obtained in a manner of combining Formula 29 and Formula 32 with each other in response to each of the channel information. It may be able to determine a global precoding matrix in various ways using an effective channel matrix.

Referring back to FIG. 2A, the network entity transmits at least one of the determined global precoding matrix and information on the transmit power to each of the base stations [A745]. For instance, information on the global precoding matrix delivered by a central processing device to a base station 1 can be represented as Formula 35 in the following.

$$B_l = \{U_l\} \quad \text{[Formula 35]}$$

Subsequently, each of the base stations transceives an uplink or a downlink signal with user equipments via information on the received global precoding matrix and the information on the transmit power [A750]. For instance, a base station 1 can transceive a signal with the user equipments using a global precoding matrix $U_l$, transmit power $P_l$ and a local precoding matrix $F_l$ determined by the base station 1. In this case, a signal transmitted by the base station 1 in downlink can be represented as Formula 36 in the following.

$$s_l^{DL} = F_l U_l P_l s \qquad \text{[Formula 36]}$$

In Formula 36, s corresponds to information transmitted to K number of user equipments via 'K×1' vector.

Figure 3A:
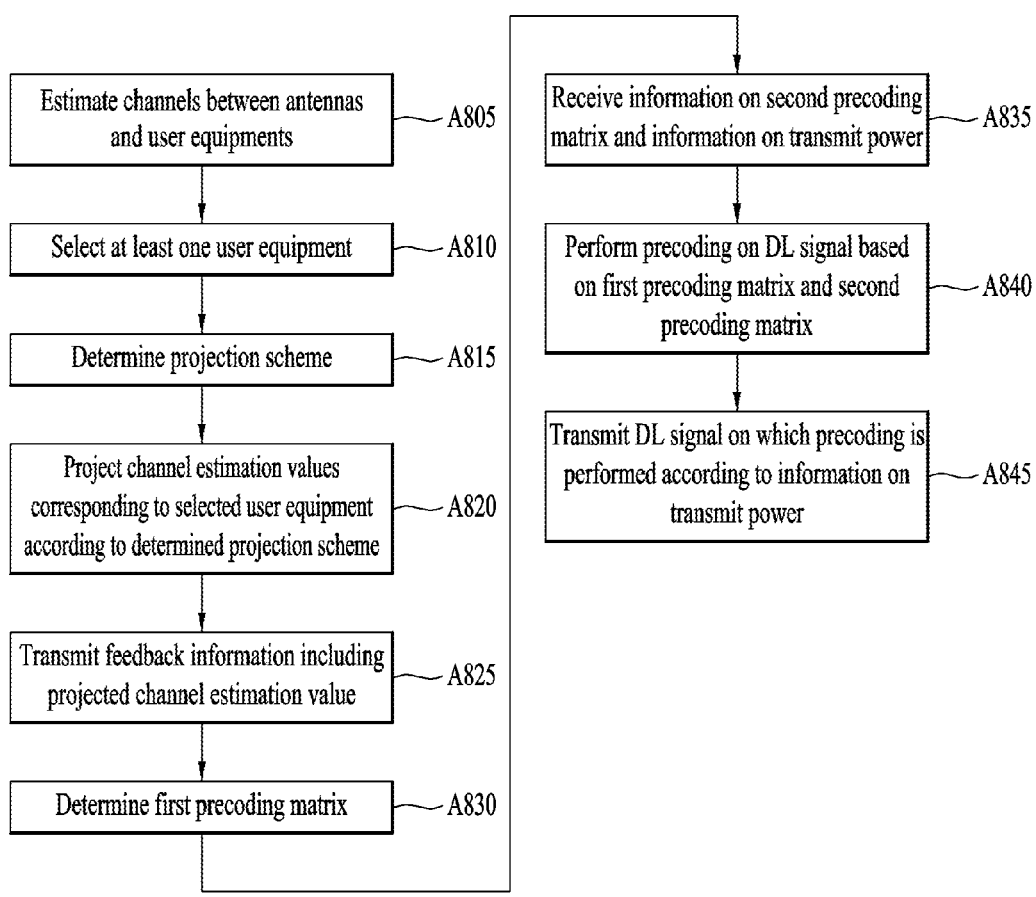
FIG. 3A is a flowchart of a method for a base station to feedback channel information according to one embodiment of the present invention.

FIG. 3A is a flowchart of a method for a base station to feedback channel information according to one embodiment of the present invention.

A base station estimates multiple channels between each of antennas and each of user equipments based on signals received from one or more user equipments via multiple antennas [A805]. The base station selects at least one or more user equipments from the user equipments [A810].

(8A-i) Selection of User Equipment Based on Average Reception Power

A base station measures average reception power of a user equipment and may be able to select a user equipment, which has transmitted average reception power equal to or less than a first threshold value. In particular, the base station projects channel estimation values corresponding to user equipments of which the average reception power is equal to or less than the first threshold value. The base station can transmit channel estimation values corresponding to user equipment of which the average reception power is greater than the first threshold value to a network entity without projecting the channel estimation values. This can be represented as Formula 37 in the following.

$$K_l^{(1)} = \{j \in K | \beta_{lj} \leq \beta_{th}\}$$

$$K_l^{(2)} = \{j \in K | \beta_{lj} < \beta_{th}\} \qquad \text{[Formula 37]}$$

In this case, $\beta_{th}$ corresponds to the first threshold value.

(8A-ii) Selection of User Equipment Based on Channel Estimation Error

According to one embodiment, a base station can select a user equipment of which a channel estimation error for a channel estimation value is equal to or greater than a second threshold value from user equipments. The channel estimation error can be represented as Formula 38 in the following.

$$q_{lk} = E\|\hat{g}_{lk} - g_{lk}\|^2 \qquad \text{[Formula 38]}$$
$$= \sum_{j \in J_{\pi_k} \setminus \{k\}} \sqrt{\frac{P_j^{UL}}{P_k^{UL}}} \beta_{lj} + \frac{1}{T^{UL} P_k^{UL}} E\|V_l \phi_{\pi_k}\|^2$$

In Formula 38, $E\|V_l \phi_{\pi_k}\|^2$ corresponds to an expected value for a noise component. A base station can select a user equipment corresponding to channel estimation values including a channel estimation error equal to or greater than a second threshold value. In particular, the base station can project the channel estimation values including the channel estimation error equal to or greater than the second threshold value and may be not able to project channel estimation values including a channel estimation error less than the second threshold value. This can be represented as Formula 39 in the following.

$$K_l^{(1)} = \{j \in K | q_{lj} \geq q_{th}\}$$

$$K_l^{(2)} = \{j \in K | q_{lj} < q_{th}\} \qquad \text{[Formula 39]}$$

In this case, $q_{th}$ corresponds to the second threshold value. A user equipment can be selected in various ways except the aforementioned method.

Referring back to FIG. 3A, the base station determines a projection scheme [A815]. The base station projects channel estimation values corresponding to a selected user equipment according to the determined projection scheme [A820]. The base station transmits feedback information including the projected channel estimation values to the network entity [A825].

Figure 5A:
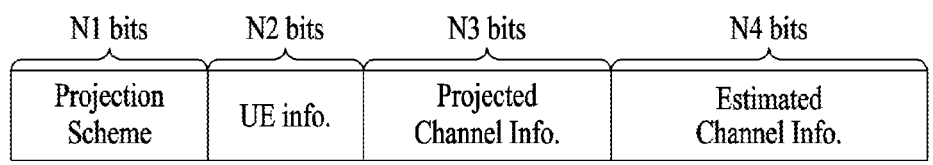
FIG. 5A is a diagram for a structure of feedback information according to one embodiment of the present invention.
Figure 5B:
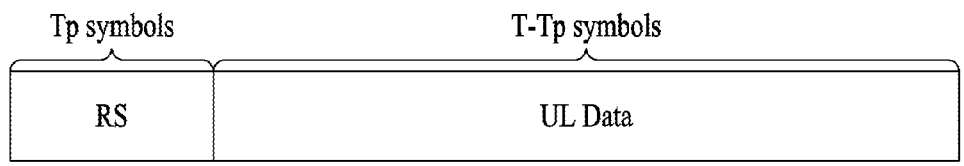
FIG. 5B is a diagram for an RS resource structure and a data resource structure according to one embodiment of the present invention.

FIG. 5A is a diagram for a structure of feedback information according to one embodiment of the present invention. Referring to FIG. 5A, feedback information includes a projection scheme index of N1 bit, user equipment information of N2 bit, projected channel information of N3 bit and estimated channel information of N4 bit. The user equipment information of N2 bit corresponds to information used for distinguishing a user equipment of which channel information is projected from a user equipment of which the channel information is not projected. A base station determines information on a local precoding matrix based on a projection matrix, which has been used for projecting a channel estimation value [A830]. The base station receives at least one of information on a global precoding matrix and information on transmit power from a network entity [A835]. The base station performs precoding on downlink signals to be transmitted to user equipments based on the information on the local precoding matrix and the information on the global precoding matrix [A840]. The base station transmits the downlink signals on which the precoding is performed to the user equipments based on the information on the downlink transmit power received from the network entity [A845].

Figure 4A:
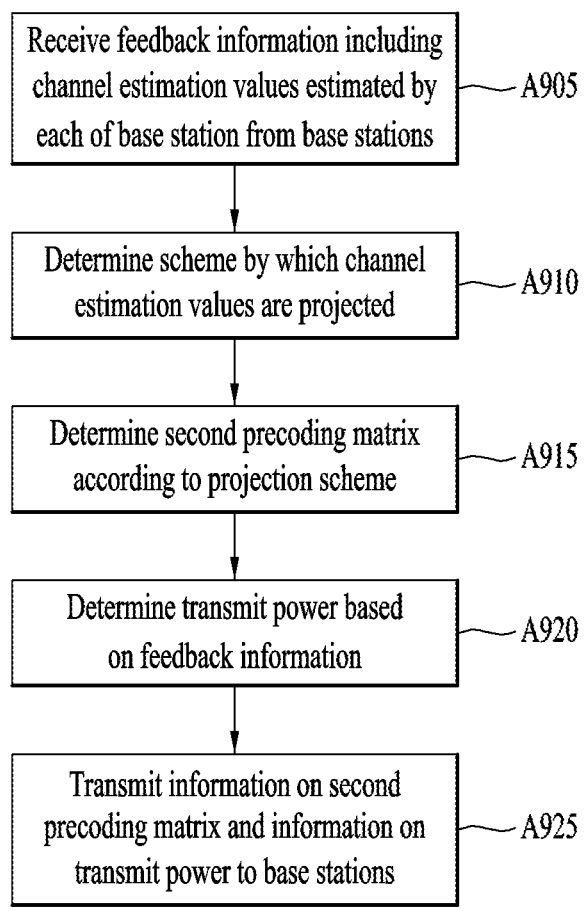
FIG. 4A is a flowchart of a method for a network entity to receive channel information from a base station according to one embodiment of the present invention.

FIG. 4A is a flowchart of a method for a network entity to receive channel information from a base station according to one embodiment of the present invention.

The network entity receives feedback information including estimation values estimated by each of base stations from one or more base stations [A905]. The network entity determines a scheme of projecting the channel estimation values [A910]. The network entity determines a global precoding matrix according to the projection scheme [A915]. In order to determine the global precoding matrix, the feedback information can be used. The network entity determines transmit power based on the feedback information [A920]. The network entity transmits information on the global precoding matrix and information on the transmit power to the base stations [A925].

Figure 6:
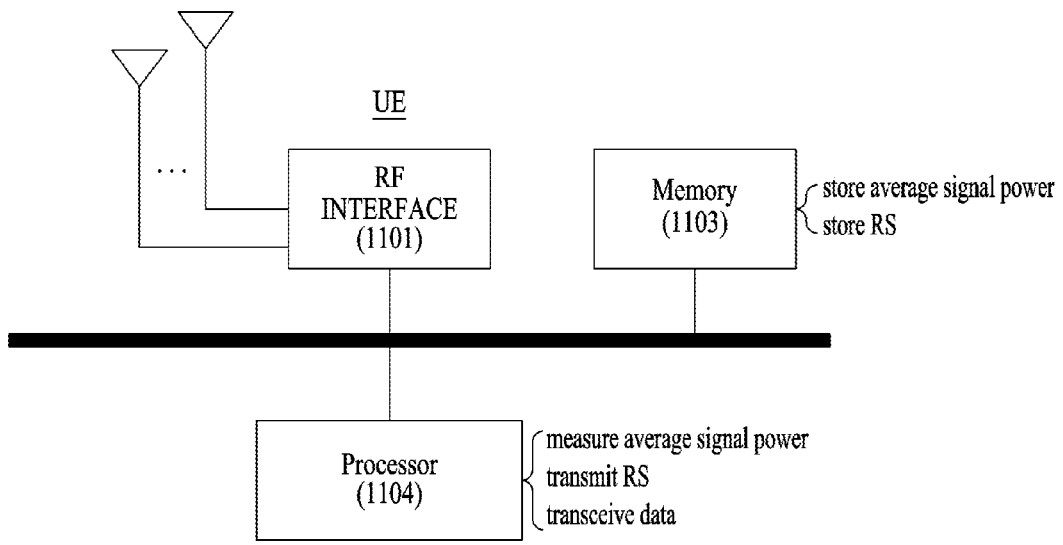
FIG. 6 is a diagram for a user equipment according to one embodiment of the present invention.

FIG. 6 is a diagram for a user equipment according to one embodiment of the present invention. The user equipment shown in FIG. 6 can perform operations of the user equipment in embodiments according to the proposal 1.

A wireless interface 1101 can include a transceiver configured to transceive an RF signal.

A memory 1103 can store average signal power and an RS. The memory 1103 can store signal power, which is transmitted from adjacent cells measured by a processor 1104 to a base station. The memory 1103 can store RS sequences used in a network.

The processor 1104 can measure average signal power. The processor 1104 can measure the average signal power transmitted from a different user equipment of a cell adjacent to a serving base station or a different user equipment of the serving cell in a manner of accumulating the average signal power. The processor 1104 stores the measured average signal power in the memory 1103. The processor 1104 transmits an RS for estimating an uplink channel to the base station. The processor 1104 can use the RS sequence stored in the memory 1103. The processor controls transmission and reception of user data transceived between the user equipment and the base station.

Figure 7:
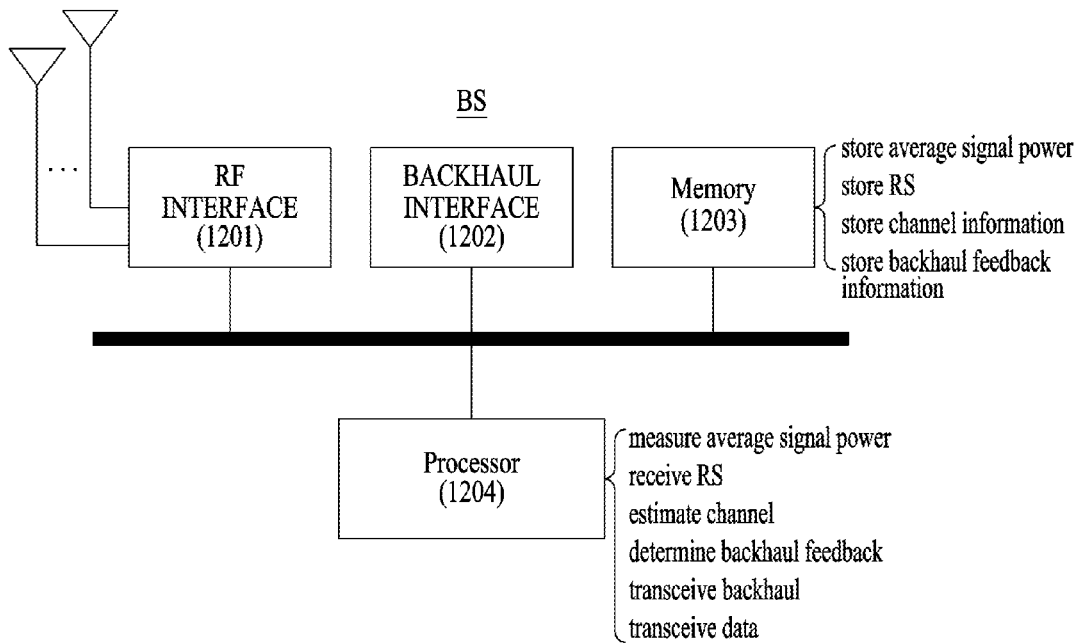
FIG. 7 is a diagram for a base station according to one embodiment of the present invention.

FIG. 7 is a diagram for a base station according to one embodiment of the present invention. The base station shown in FIG. 7 can perform operations of the base station in embodiments according to the proposal 1.

A wireless interface 1201 transceives signals with user equipments via a plurality of antennas.

A processor 1204 estimates multiple channels between each of antennas and each of user equipments based on the signals received from the user equipments. The processor 1204 projects at least a part of channel estimation values of the multiple channels to a second space from a first space.

A backhaul interface 1202 transmits feedback information including at least a part of the channel estimation values projected to the second space to a network entity according to a control of the processor 1204.

A memory 1203 can store reception signal power of a user equipment measured by a processor 1204 or received from the user equipment. The memory 1203 can store RS sequences used in a network. The memory 1203 can store channel information estimated by the processor 1204. The memory 1203 can store feedback information or information received from a network entity. The memory 1203 can store a local precoding matrix determined by the processor 1204.

The processor 1204 can measure power of a signal transmitted by each user equipment. The processor 1204 stores measured average reception power in the memory 1203. The processor 1204 estimates channel information via an RS received from the user equipment. The processor 1204 stores the estimated channel information in the memory 1203. The processor 1204 can project the estimated channel information. The processor 1204 can determine a local precoding matrix. The processor 1204 can transmit the feedback information to the network entity or receive information from the network entity. The processor 1204 can play a role in transceiving user data with the user equipment.

Figure 8:
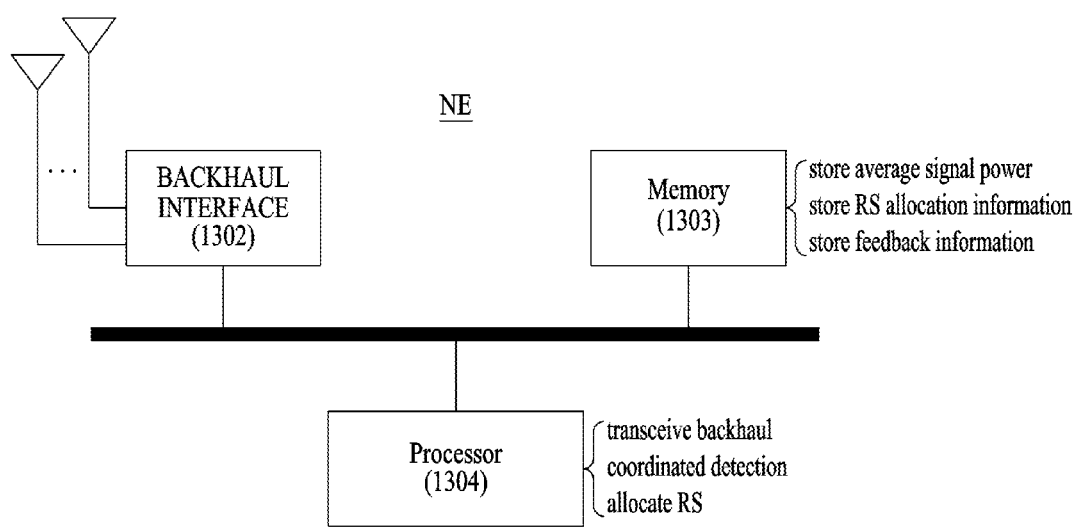
FIG. 8 a diagram for a network entity according to one embodiment of the present invention.

FIG. 8 a diagram for a network entity according to one embodiment of the present invention. The network entity shown in FIG. 8 can perform operations of the network entity in embodiments according to the proposal 1.

A backhaul interface 1302 receives first feedback information including first channel estimation values between antennas of a first base station and user equipments from the first base station according to a control of a processor 1304. The backhaul interface 1302 receives second feedback information including second channel estimation values between antennas of a second base station and the user equipments from the second base station. At least a part of the first channel estimation values and the second channel estimation values can be projected to a second space from a first space.

A memory 1303 can store feedback information received from a base station. The memory 1303 can store a global precoding matrix determined by a processor 1304. The memory 1303 can store information on transmit power determined by the processor 1304.

The processor 1304 can control the backhaul interface 1302 to receive feedback information from the base station and transmit information to the base station. The processor 1304 determines a global precoding matrix and can store the global precoding matrix in the memory 1303. The processor 1304 can determine information on transmit power using the information stored in the memory 1303.

B. Embodiment According to Proposal 2

Figure 2B:
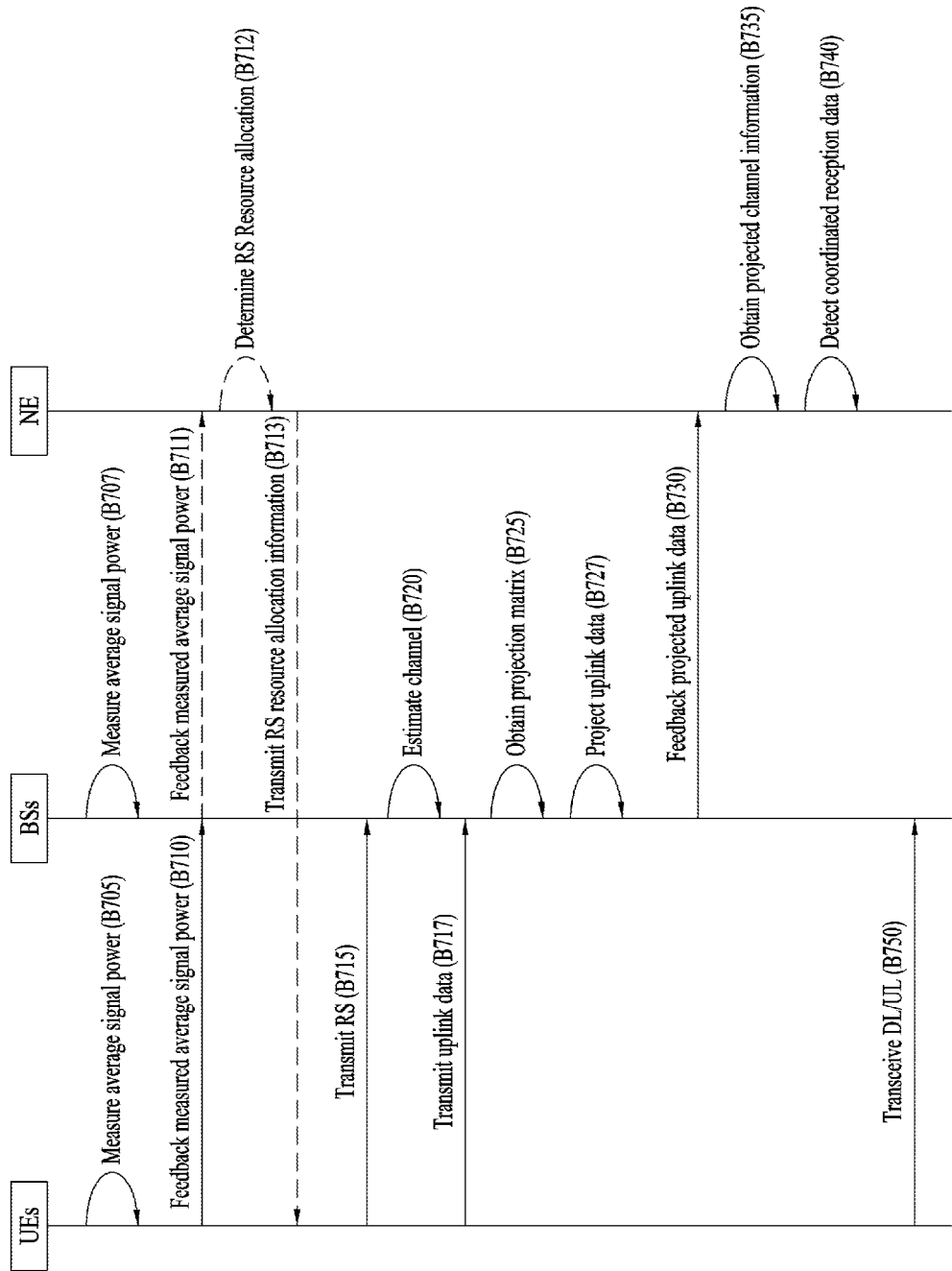
FIG. 2B is a flowchart for a method of transmitting or receiving projected uplink data according to one embodiment of the present invention.

FIG. 2B is a flowchart for a method of transmitting or receiving projected uplink data according to one embodiment of the present invention.

Base stations can measure average power of each signal of user equipments received in uplink [B707]. The user equipments measure average power of a signal received in downlink [B705] and feedback the measured average power to the base stations [B710]. The user equipments can transmit uplink RSs to the base stations to enable the base station to estimate an uplink channel [B715]. A network entity determines at least one of an index of an RS and RS resource allocation and may be then able to deliver at least one of the index of the RS and the RS resource allocation to the user equipment [B711/B712/B713]. In this case, the RS transmitted by the user equipment in the step B715 may be transmitted based on information on the RS resource allocation determined in the step B713. The base stations estimate an uplink channel based on the uplink RS [B720]. The base stations receive uplink data from the user equipments [B717]. The base stations obtain a projection matrix based on information on the estimated channel (or a channel matrix) [B725]. The base stations project at least a part of the estimated channel information or the uplink data using the projection matrix.

(7B-i) Feedback Information

The base stations transmit feedback information including the projected uplink data to the network entity [B730]. The feedback information can further include information on a projection scheme. For instance, in case of projecting whole uplink data, feedback information $F_l$ transmitted to the network entity by a base station 1 can be represented as Formula 40 in the following.

$$F_l = \{\tilde{r}_l, \text{projection\_type}\} \qquad \text{[Formula 40]}$$

In Formula 40, $\tilde{r}_l$ corresponds to information indicating a projected uplink data and projection_type corresponds to information indicating a projection scheme.

(7B-ii) Obtaining Projected Channel Information

The network entity can obtain projected channel information based on the feedback information [B735]. The projected channel information can be obtained based on information on a projection scheme received from a base station. The network entity can store the projected uplink data and the projected channel information in a manner of matching the projected uplink data and the projected channel information with each other as shown in Formula 41 in the following.

$$S = \{\tilde{r}_1, \tilde{r}_2, \ldots, \tilde{r}_L, \tilde{G}_1, \tilde{G}_2, \ldots, \tilde{G}_L\} \qquad \text{[Formula 41]}$$

In Formula 41, $\tilde{r}_L$ and $\tilde{G}_L$ indicate a projected uplink data corresponding to a base station L and projected channel information, respectively.

(7B-iii) Detection of Coordinated Reception Data

The network entity detects coordinated reception data of the base stations [B740]. The network entity respectively receives a projected uplink data transmitted by a base station 1, a projected uplink data transmitted by a base station 2, . . . , a projected uplink data transmitted by a base station L. The network entity can cooperatively detect uplink data transmitted by a user equipment k in a manner of combining the L number of projected uplink data with each other.

The network entity can detect the coordinated reception data using feedback information. The feedback information stored in the network entity can be represented as a matrix linear equation shown in Formula 42 in the following.

$$\tilde{r}=\tilde{G}s+\tilde{n}$$ [Formula 42]

In Formula 42, it may be represented as $\tilde{r}=[\tilde{r}_1^H, \tilde{r}_2^H, \ldots, \tilde{r}_L^H]^H$ and $\tilde{G}=[\tilde{G}_1^H, \tilde{G}_2^H, \ldots, \tilde{G}_L^H]^H$.

The network entity can determine a detector to detect the coordinated reception data of the base stations.

In case of using a zero-forcing linear detector, a detected coordinated reception data ŝ can be represented as Formula 43 in the following.

$$\hat{s}=(\tilde{G}^H\tilde{G})^{-1}\tilde{G}^H\tilde{r}$$ [Formula 43]

In Formula 43, $(\tilde{G}^H\tilde{G})^{-1}\tilde{G}^H$ indicates the zero-forcing linear detector.

In case of using a regularized linear detector, a detected coordinated reception data ŝ can be represented as Formula 44 in the following.

$$\hat{s}=(\tilde{G}^H\tilde{G}+\chi I)^{-1}\tilde{G}^H\tilde{r}$$ [Formula 44]

In Formula 44, $(\tilde{G}^H\tilde{G}+\chi I)^{-1}\tilde{G}^H$ indicates the regularized linear detector and $\chi$ corresponds to a regularized constant.

Figure 3B:
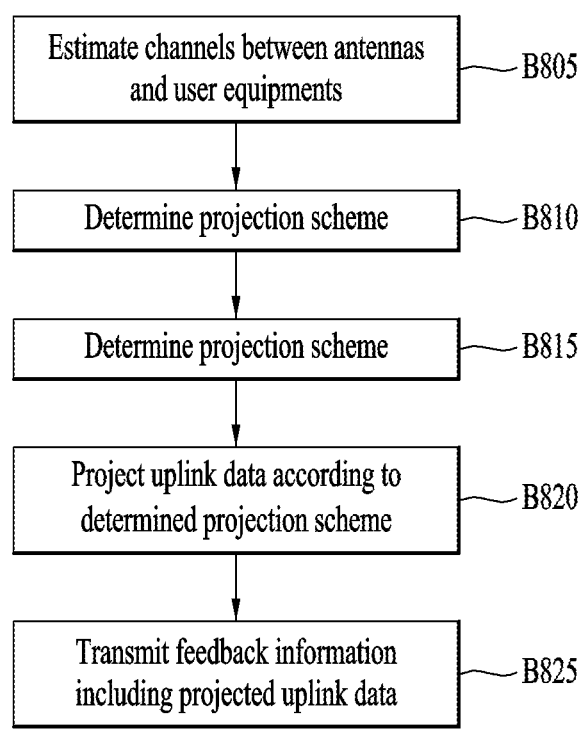
FIG. 3B is a flowchart of a method for a base station to feedback projected uplink data according to one embodiment of the present invention.

FIG. 3B is a flowchart of a method for a base station to feedback projected channel information according to one embodiment of the present invention.

A base station estimate multiple channels between each of antennas and each of user equipments based on signals received from one or more user equipments via multiple antennas [B805]. The base station selects a projection scheme [B810]. The base station obtains a projection matrix according to the selected projection scheme [B815]. The base station projects uplink data to a second space from a first space based on the selected projection scheme and the projection matrix [B820]. The base station transmits feedback information including the projected uplink data to a network entity [B825].

Figure 4B:
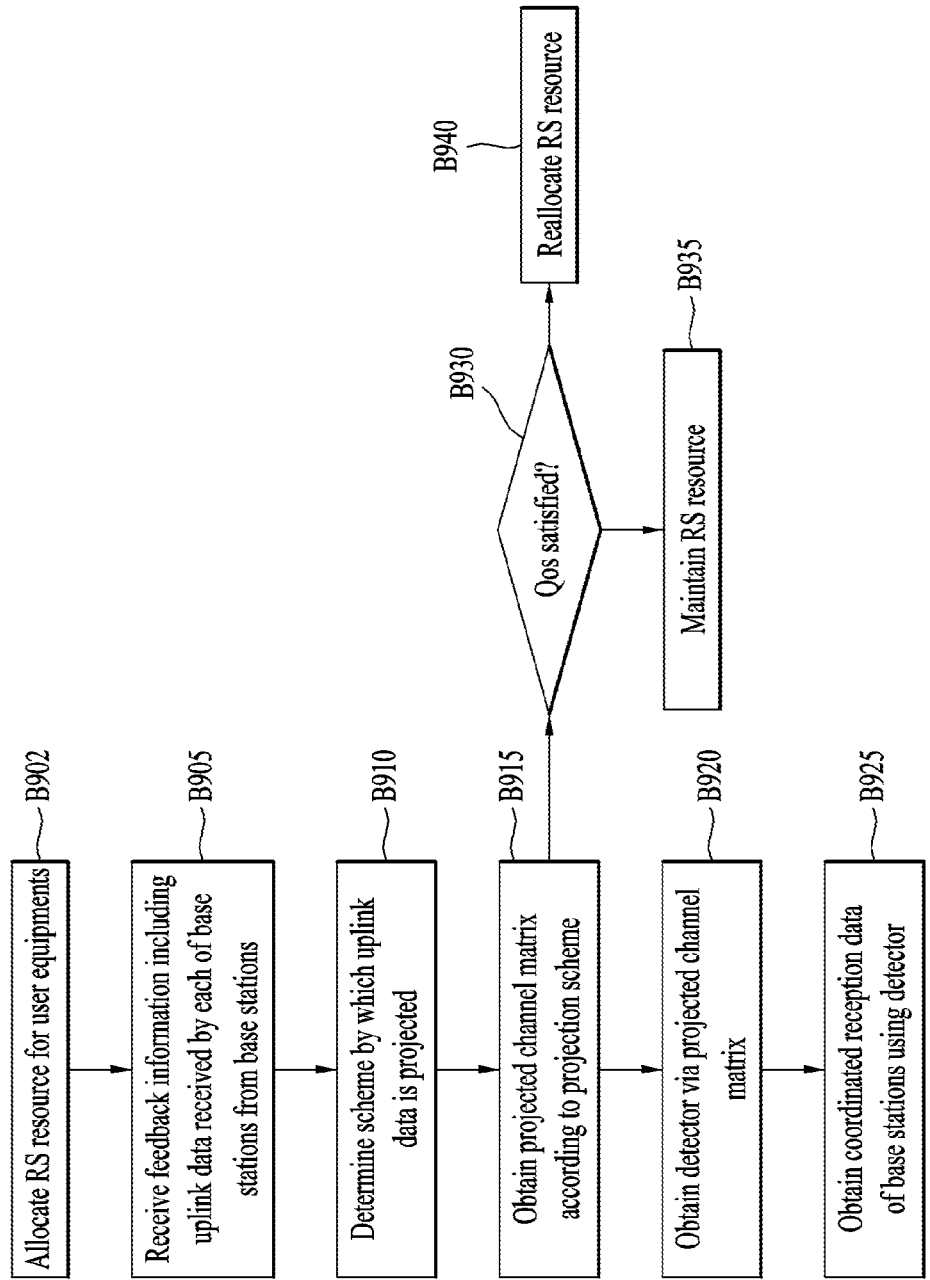
FIG. 4B is a flowchart of a method for a network entity to receive projected uplink data from a base station according to one embodiment of the present invention.

FIG. 4B is a flowchart of a method for a network entity to receive projected uplink data from a base station according to one embodiment of the present invention.

A network entity can allocate an RS resource and an RS index to enable user equipments to transmit an uplink RS [B902]. The network entity receives feedback information including uplink data received by each of the user equipments from one or more base stations [B905]. The network entity determines a scheme by which the uplink data is projected [B910]. The network entity obtains a channel matrix projected according to the projection scheme [B915]. The network entity can determine a detector configured to eliminate inter-UE interference from a first uplink data and a second uplink data based on the projected channel matrix [B920]. The network entity can obtain a coordinated reception data of a first base station and a second base station from the first uplink data and the second uplink data based on the projected channel matrix [B925]. Meanwhile, the network entity can determine whether a current channel state satisfies a QoS (quality of service) parameter of the user equipments using the projected channel matrix [B930]. For instance, if the QoS of the user equipments is less than a threshold value, the network entity can reallocate a resource, which is allocated to transmit an RS [B940]. If the QoS is equal to or greater than the threshold value, the network entity maintains the RS resource [B935].

A user equipment shown in FIG. 6 can perform operations of user equipments in the embodiments according to the proposal 2.

A wireless interface 1101 can include a transceiver configured to transceive an RF signal.

A memory 1103 can store average signal power and an RS. The memory 1103 can store signal power, which is transmitted from adjacent cells measured by a processor 1104 to a base station. The memory 1103 can store RS sequences used in a network. The stored RS sequences can be used for uplink channel estimation.

The processor 1104 can measure average signal power. The processor 1104 can measure the average signal power transmitted from a different user equipment of a cell adjacent to a serving base station or a different user equipment of the serving cell in a manner of accumulating the average signal power. The processor 1104 stores the measured average signal power in the memory 1103. The processor 1104 transmits an RS for estimating an uplink channel to the base station. The processor 1104 can use the RS sequence stored in the memory 1103. The processor controls transmission and reception of user data transceived between the user equipment and the base station.

A base station shown in FIG. 7 can perform operations of base station in the embodiments according to the proposal 2.

A wireless interface 1201 transceives signals with user equipments via multiple antennas.

A processor 1204 obtains a projection matrix based on channel information estimated for multiple channels between antennas and each of the user equipments. The processor 1204 projects uplink data received from the user equipments to a second space from a first space using the projection matrix.

A backhaul interface 1202 transmits feedback information including the uplink data projected to the second space to a network entity according to a control of the processor 1204.

A memory 1203 can store reception signal power of a user equipment measured by a processor 1204 or received from the user equipment. The memory 1203 can store RS sequences used in a network. The stored RS sequences are used for uplink channel estimation. The memory 1203 can store channel information estimated by the processor 1204. The memory 1203 can store feedback information or information received from the network entity. The memory 1203 can store a first precoding matrix determined by the processor 1204.

The processor 1204 can measure power of a signal transmitted by each user equipment. The processor 1204 stores measured average reception power in the memory 1203. The processor 1204 estimates channel information via an RS received from the user equipment. The processor 1204 can project the estimated channel information. The processor 1204 can determine a first precoding matrix. The processor 1204 can transmit the feedback information to the network entity or receive information from the network entity. The processor 1204 can play a role in transceiving user data with the user equipment.

The network entity shown in FIG. 8 can perform operations of the network entity in the embodiments according to the proposal 2.

A backhaul interface 1302 receives first feedback information including first uplink data of user equipments from a first base station according to a control of a processor 1304. The backhaul interface 1302 receives second feedback information including second uplink data of the user equipments from a second base station.

A memory 1303 can store the feedback information received from the base station. The memory 1303 can store a second precoding matrix determined by the processor 1304. The memory 1303 can store information on transmit power determined by the processor 1304.

The processor 1304 can control the backhaul interface 1302 to receive the feedback information from the base station and transmit information to the base station. The processor 1304 determines the second precoding matrix and can store the second precoding matrix in the memory 1303. The processor 1304 can determine information on transmit power using the information stored in the memory 1303.

Embodiment According to Proposal 3

Clustering of User Equipments

User equipments can be clustered as virtual user equipments by a base station using estimated channel information. For instance, one or more user equipments may belong to single virtual user equipment. The user equipments can be clustered by the base station based on a short-term fading component among the channel information. For instance, if a short-term fading component of a first user equipment is similar to a short-term fading component of a second user equipment, the first user equipment and the second user equipment can be clustered as an identical virtual user equipment.

Assume that a set of user equipments clustered as a $g^{th}$ virtual cluster in a base station 1 corresponds to $I_{lg}$. A virtual user equipment can be determined in a manner that reference components $\{v_{lj}\}_{i=1}^{G}$ are set to each of the G number of virtual user equipments and the base station 1 measures similarity between a direction of the reference components and a direction of a short-term fading component of a user equipment. The reference components may correspond to vectors orthogonal to each other. A mapping relation between a user equipment j and a virtual user equipment can be represented as Formula 45 in the following.

$$I_{lg} = \left\{ j \Big| \underset{i=1,\ldots,G}{\mathrm{argmax}} \left| h_{lj}^{H} v_{i} \right| = g \right\} \quad \text{[Formula 45]}$$

FIG. 2C is a flowchart for a method of performing precoding according to one embodiment of the present invention.

User equipments measure average power of signals received in downlink and feedback the measured average power to base stations. The user equipments can transmit uplink RSs to the base stations to enable the base stations to estimate an uplink channel [C705]. The base stations estimate the uplink channel based on the uplink RSs [C710]. The K number of user equipments is clustered as the G number of virtual user equipments by the base stations based on the uplink RSs [C715]. In this case, the G may correspond to a natural number. The channel information, which is estimated to cluster the user equipments as the virtual user equipments may correspond to a short-term fading component. The base stations transmit feedback information including a result of the clustering and a second fading component to the network entity [C720]. In this case, the second fading component may correspond to a long-term fading component. For instance, a base station 1 transmits the result of the clustering $\{I_{lg}\}_{g=1}^{G}$ and the long-term fading component $\{\beta_{lk}\}_{k=1}^{K}$ to the network entity.

The network entity can store a global long-term fading component $\{\beta_{lk}\}_{l=k=1}^{L,K}$ in a manner of combining local long-term fading components $\{\beta_{lk}\}_{k=1}^{K}$, which is periodically or aperiodically received from each of the base stations, with each other. The network entity can store information on a global virtual user equipment $\{I_{lg}\}_{l=1,g=1}^{L,G}$ in a manner of combining information on a local virtual user equipment $\{I_{lg}\}_{g=1}^{G}$, which is periodically or aperiodically received from each of the base stations, with each other.

(7C-i) First Precoding Matrix

A first precoding matrix corresponds to information used for a first precoding. The first precoding is used to eliminate interference between user equipments belonging to an identical virtual user equipment.

A network entity obtains the first precoding matrix based on feedback information. According to one embodiment, a short-term fading component is not used for obtaining the first precoding matrix and a long-term fading component can be used only.

For instance, assume that the first precoding matrix obtained by the network entity corresponds to $F^{M}=[(F_{1}^{M})^{T}, (F_{2}^{M})^{T}, \ldots, (F_{L}^{M})^{T}]^{T}$. In this case, $F_{1}^{M}$ indicates a first precoding matrix for a base station 1. For instance, the first precoding matrix can be obtained based on Formula 46 in the following.

$$F^{M}=Z^{H}(ZZ^{H}N_{0}P^{-1})^{-1} \quad \text{[Formula 46]}$$

In Formula 46, $N_{0}$ corresponds to power of noise, P corresponds to transmit power of a signal described in the following, M corresponds to a symbol indicating a macro precoding or a first precoding $Z=[Z_{1}, Z_{2}, \ldots, Z_{L}]$ and an element (j, g) of $Z_{l}$ can be defined as Formula 47 in the following.

$$[Z_{l}]_{jg} = \sqrt{\beta_{lj}} \sum_{k \in J_{\pi_{j}}} \omega_{lkg} \varphi_{ljk} \quad \text{[Formula 47]}$$

In Formula 47, $\omega_{lkg}$ is a weight for user equipments belonging to an identical virtual user equipment. The weight can be used for assigning power to the user equipments clustered as single virtual user equipment. For instance, identical power can be assigned to the user equipment clustered as the identical virtual user equipment in a manner of assigning an identical weight $$\omega_{lkg} = \frac{1}{|I_{lg}|}$$

to the user equipments.

$\phi_{ljk}$ is explained with reference to Formula 48 in the following.

(7C-ii) Transmit Power

A network entity can determine transmit power, which is to be assigned according to a base station or a user equipment, to satisfy transmission quality and QoS required by a user equipment. For instance, information on the determined transmit power may correspond to a diagonal matrix $P=\mathrm{diag}(P_{1}, P_{2}, \ldots, P_{K})$. If power of a reception signal required by a user equipment k corresponds to $\gamma_{k}$, transmit power can be determined as Formula 48 in the following.

$$P_{k} = \gamma_{k} N_{0} \left| \sum_{l=1}^{L} \sqrt{\beta_{lk}} [f_{lk}^{M}]_{D_{lk}} \sum_{j \in I_{D_{lk}}} e_{ljD_{lk}} \right|^{-2} \quad \text{[Formula 48]}$$

In Formula 48, $N_O$ corresponds to power of noise, $$D_{lk} = \underset{g=1,\ldots,G}{\mathrm{argmax}}\left|\hat{h}_{lk}^H v_g\right|,$$

$$e_{ljg} = \sum_{k\in J_{\pi_k}} \omega_{lkg}\varphi_{ljk},$$

and $\phi_{ljk}$ are mentioned earlier in Formula 7. In this case, since the $$D_{lk} = \underset{g=1,\ldots,G}{\mathrm{argmax}}\left|\hat{h}_{lk}^H v_g\right|$$

corresponds to a result of clustering of a virtual user equipment, it is able to know that a short-term fading component is not used in Formula 48 and feedback information received from a base station is used only.

The network entity performs a first precoding based on the first precoding matrix and the determined transmit power [C735] and transmits a signal on which the first precoding is performed to the base station [C740]. The signal on which the first precoding is performed can be defined as Formula 49 in the following.

$$F_l^M P^{1/2} s \qquad [\text{Formula 49}]$$

In Formula 49, $F_l^M$ corresponds to a first precoding matrix corresponding to a base station 1, P corresponds to the determined transmit power and s corresponds to a symbol of a signal to be transmitted.

(7C-iii) Second Precoding Matrix

Base stations perform second precoding in a manner of receiving the signal on which the first precoding is performed [C745]. The second precoding is performed to eliminate interference from between the G number of virtual user equipments and can be performed using a second precoding matrix. The second precoding can also be called micro precoding.

The second precoding matrix can be determined by base stations [C725]. The base stations can determine the second precoding matrix using at least one selected from the group consisting of a short-term fading component, a long-term fading component and information on a virtual user equipment among estimated channel information. If a second precoding matrix determined by a base station 1 corresponds to $F_l^\mu = [f_{l1}^\mu, f_{l2}^\mu, \ldots, f_{lG}^\mu]$, for instance, the second precoding matrix determined by the base station 1 using a matched filter can be represented as Formula 50 in the following.

$$f_{lg}^\mu = \sum_{k\in I_{lg}} \omega_{lkg}\hat{h}_{lk} \qquad [\text{Formula 50}]$$

In Formula 50, $\omega_{lkg}$ corresponds to a weight of user equipments belonging to an identical virtual user equipment and may refer to the explanation on Formula 47.

A base station performs second precoding on the signal $F_l^M P^{1/2} s$ on which the first precoding is performed [C745]. The signal on which the second precoding is performed can be represented as Formula 51 in the following.

$$F_l^\mu F_l^M P^{1/2} s \qquad [\text{Formula 51}]$$

Figure 3C:
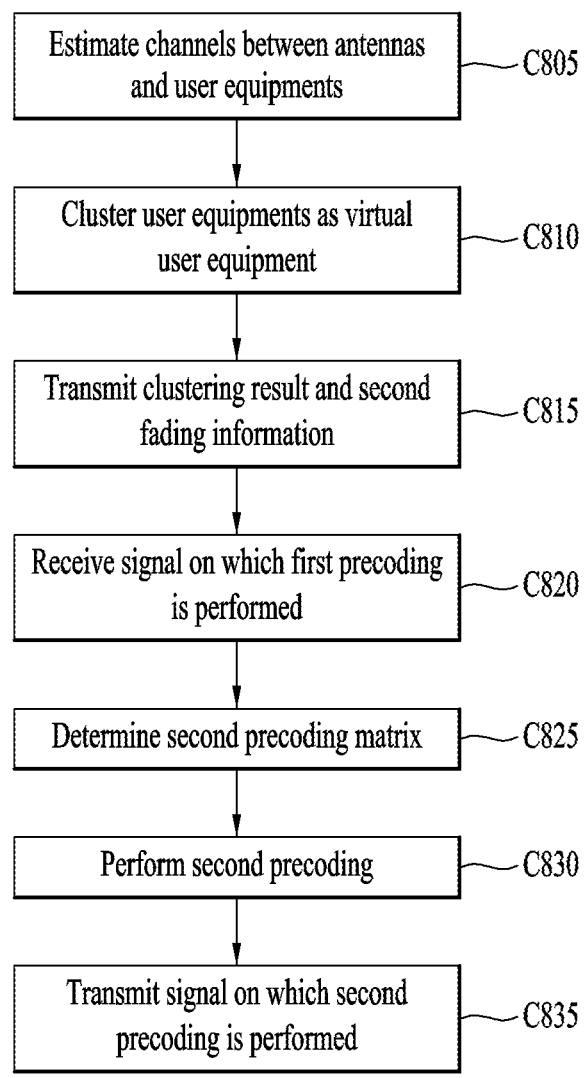
FIG. 3C is a flowchart of a method for a base station to perform precoding according to one embodiment of the present invention.

FIG. 3C is a flowchart of a method for a base station to perform precoding according to one embodiment of the present invention.

A base station estimate multiple channels between each of antennas and each of user equipments based on signals received from one or more user equipments via multiple antennas [C805]. The user equipments are clustered as virtual user equipments by the base station based on the estimated channel information [C810]. The base station transmits feedback information including virtual user equipment information corresponding to a result of clustering the user equipments and second fading information to a network entity [C815]. The base station receives a signal of user equipments on which first precoding is performed from the network entity [C820]. The base station determines a second precoding matrix [C825]. The base station performs second precoding on the signal of the user equipments on which the first precoding is performed using the second precoding matrix [C830]. The base station transmits the signal on which the second precoding is performed to the user equipments [C835].

Figure 4C:
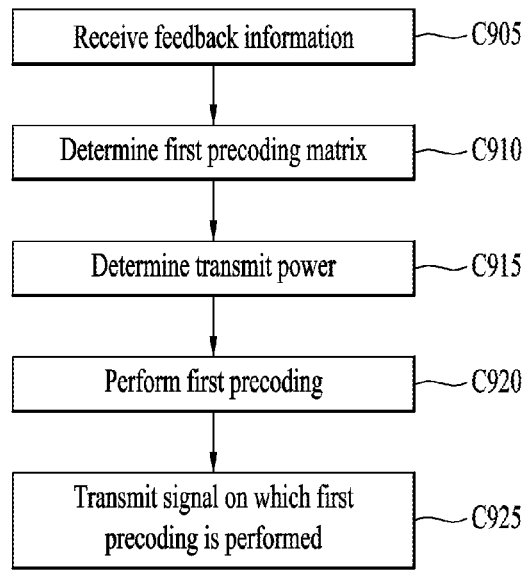
FIG. 4C is a flowchart of a method for a network entity to perform precoding according to one embodiment of the present invention.

FIG. 4C is a flowchart of a method for a network entity to perform precoding according to one embodiment of the present invention. Explanation on contents overlapped with what is mentioned earlier is omitted at this time.

The network entity receives feedback information on the user equipments, which are clustered as the virtual user equipments by each of base stations, from one or more base stations [C905]. The network entity determines a first precoding matrix configured to eliminate interference from between user equipments clustered as an identical virtual user equipment based on the feedback information [C910]. The network entity determines transmit power of the user equipments or transmit power of the base stations based on the feedback information [C915]. The network entity performs first precoding on signals of the user equipments [C920] and transmits the signals on which the first precoding is performed to the base stations [C925].

A base station shown in FIG. 7 can perform operations of the base station in embodiments according to the proposal 3.

A wireless interface 1201 transceives signals with user equipments via multiple antennas.

A processor 1204 obtains channel information estimated for multiple channels between each of user equipments and each of base stations and the user equipments are clustered as virtual user equipments based on the estimated channel information.

The processor 1204 determines a second precoding matrix and determines a weight of the user equipments to perform second precoding.

A backhaul interface 1202 transmits feedback information to a network entity according to a control of the processor 1204.

A memory 1203 stores a local short-term fading component estimated by the processor 1204 and a long-term fading component. The memory 1203 stores information on a local virtual user equipment for user equipments clustered by the processor 1204.

A network entity shown in FIG. 8 can perform operations of the network entity in the embodiments according to the proposal 3.

A backhaul interface 1302 receives feedback information on user equipments clustered as virtual user equipments from base stations according to a control of a processor 1304.

The processor 1304 determines a first precoding matrix configured to eliminate interference from between user equipments clustered as an identical virtual user equipment based on the feedback information.

The processor 1304 determines a first precoding matrix and determines a weight to perform first precoding. The processor determines transmit power of the user equipments or transmit power of the base stations.

A memory 1303 stores global long-term fading information and global virtual user equipment information.

Detail configuration of the base station device and the UE device can be implemented to independently apply the aforementioned contents explained in various embodiments of the present invention or to simultaneously apply two or more embodiments. The overlapped contents are omitted for clarity of explanation.

And, in explaining FIG. 14, explanation on the base station device 1410 can be identically applied to a relay device as a main agent of DL transmission or a main agent of UL reception. Explanation on the UE device 1420 can be identically applied to a relay device as a main agent of DL reception or a main agent of UL transmission.

Embodiments of the present invention can be implemented using various means. For instance, embodiments of the present invention can be implemented using hardware, firmware, software and/or any combinations thereof In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

What is claimed is:

1. A method of transmitting feedback information to a network entity by a base station supporting multi-user multi-input multi-output (MU-MIMO), the method comprising:

measuring channel information for multiple channels between antennas of the base station and each of user equipments;

obtaining a projection matrix based on the measured channel information;

projecting one of the channel information or uplink data received from the user equipments to a second space from a first space using the projection matrix; and transmitting feedback information containing one of the projected channel information or the projected uplink data to the network entity;

receiving, from the network entity, downlink data for the user equipments on which a precoding is performed based on a predetermined transmit power, wherein the predetermined transmit power is determined based on the feedback information, wherein the first space corresponds to a complex space, the second space corresponds to a real number space and a size of the channel information or a size of the uplink data projected to the second space is reduced after the channel information or the uplink data is projected.

2. The method of claim 1, further comprising:

selecting at least one user equipment from the user equipments based on average reception power or a channel estimation error, wherein the projecting the one of the channel information or the uplink data comprises projecting a channel estimation value corresponding to the selected at least one user equipment among the channel information to the second space from the first space.

3. The method of claim 2, wherein the projecting the one of the channel information or uplink data comprises obtaining K1*K1 channel estimation values of a real number from K1*M complex channel estimation values selected from K*M complex channel estimation values contained in the channel information, and wherein the K corresponds to a number of user equipments transmitting signals, wherein the K1 corresponds to a number of the at least one selected user equipment and wherein the M corresponds to a number of the antennas of the base station.

4. The method of claim 1, wherein the projecting the one of the channel information or the uplink data comprises eliminating a fading component having smaller coherence time from among a first fading component and a second fading component for the multiple channels, the first fading component and the second fading component are contained in the channel information or the uplink data in the first space.

5. The method of claim 1, wherein obtaining the projection matrix comprises obtaining the projection matrix using at least one of:

a first scheme based on a Hermitian matrix of the estimated channel information;

a second scheme based on a Hermitian matrix of a short-term fading component obtained from the estimated channel information; or a third scheme based on a multiple of the Hermitian matrix of the short-term fading component obtained from the estimated channel information and a long-term fading component.

6. The method of claim 1, further comprising:
clustering the user equipments to virtual user equipments based on the estimated channel information,
wherein first precoding is performed on downlink data for the user equipments by a first precoding matrix according to a result of the clustering and second precoding is performed on the downlink data on which the first precoding is performed by a second precoding matrix.

7. The method of claim 6, wherein the first precoding is configured to eliminate interference from between user equipments clustered as an identical virtual user equipment and the second precoding is configured to eliminate interference from between the virtual user equipments.

8. The method of claim 6, wherein the first precoding matrix is determined based on a short-term fading component contained in the channel information estimated by the base station and a short-term fading component contained in channel information estimated by other base station performing coordinated transmission with the base station and wherein the second precoding matrix is determined based on a long-term fading component contained in the channel information estimated by the base station.

9. The method of claim 6, wherein the feedback information further comprises information on a long-term fading component among the estimated channel information and the result of the clustering, and
the method further comprises:
receiving, from the network entity, the downlink data for the user equipments on which the first precoding is performed using the information on the long-term fading component; and
performing the second precoding on the downlink data for the user equipments on which the first precoding is performed, using a short-term fading component among the estimated channel information.

10. A base station transmitting feedback information to a network entity, comprising:
multiple antennas configured to perform multi-user multi-input multi-output (MU-MIMO);
a processor configured to measure channel information for multiple channels between antennas of the base station and each of user equipments, to obtain a projection matrix based on the measured channel information, to project one of the channel information or uplink data received from the user equipments to a second space from a first space using the projection matrix; and
a backhaul interface configured to
transmit feedback information containing one of the projected channel information or the projected uplink data to the network entity, and
receive, from the network entity, downlink data for the user equipments on which a precoding is performed based on a predetermined transmit power, wherein the predetermined transmit power is determined based on the feedback information,
wherein the first space corresponds to a complex space, the second space corresponds to a real number space and a size of the channel information or a size of the uplink data projected to the second space is reduced after the channel information or the uplink data is projected.

* * * * *